United States Patent
Atkins et al.

(10) Patent No.: US 8,230,034 B2
(45) Date of Patent: Jul. 24, 2012

(54) AUTOMATIC DISPLAY OF EMAIL DISTRIBUTION LISTS

(75) Inventors: Richard J. Atkins, New South Wales (AU); Sunny Singh Kalsi, New South Wales (AU); Peggy J. Leisher-Samenfink, Erie, CO (US); Rohan Lenard, New South Wales (AU); David Thambiratnam, New South Wales (AU); Michael J. Thomas, Denver, CO (US); Bradley B. Williams, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/115,413

(22) Filed: May 25, 2011

(65) Prior Publication Data

US 2011/0225254 A1 Sep. 15, 2011

Related U.S. Application Data

(62) Division of application No. 11/554,442, filed on Oct. 30, 2006.

(51) Int. Cl.
G06F 7/00 (2006.01)

(52) U.S. Cl. ......... 709/206; 715/816; 707/102; 707/534

(58) Field of Classification Search .................... 709/206
See application file for complete search history.

(56) References Cited

U.S. PATENT DOCUMENTS

| | | | |
|---|---|---|---|
| 4,819,191 A | 4/1989 | Scully et al. | |
| 4,831,552 A | 5/1989 | Scully et al. | |
| 5,050,077 A | 9/1991 | Vincent | |
| 5,124,912 A | 6/1992 | Hotaling et al. | |
| 5,197,000 A | 3/1993 | Vincent | |
| 5,206,903 A | 4/1993 | Kohler et al. | |
| 5,216,603 A | 6/1993 | Flores et al. | |
| 5,323,314 A | 6/1994 | Baber et al. | |
| 5,428,784 A | 6/1995 | Cahill, Jr. | |
| 5,555,346 A | 9/1996 | Gross et al. | |
| 5,619,555 A | 4/1997 | Fenton et al. | |
| 5,627,978 A | 5/1997 | Altom et al. | |
| 5,774,867 A | 6/1998 | Fitzpatrick et al. | |
| 5,793,365 A | 8/1998 | Tang et al. | |
| 5,813,013 A | 9/1998 | Shakib et al. | |
| 5,828,747 A | 10/1998 | Fisher et al. | |
| 5,889,945 A | 3/1999 | Porter et al. | |
| 5,893,073 A | 4/1999 | Kasso et al. | |

(Continued)

FOREIGN PATENT DOCUMENTS

EP 1014286 6/2000

(Continued)

OTHER PUBLICATIONS

U.S. Appl. No. 10/770,640, filed Feb. 2, 2004, Mohler.

(Continued)

*Primary Examiner* — Ashok Patel
*Assistant Examiner* — Andrew Goldberg
(74) *Attorney, Agent, or Firm* — Sheridan Ross P.C.

(57) ABSTRACT

Embodiments of the present invention are directed generally to autocompete functionality in messaging applications. The autocomplete functionality, for example, generates frequently and/or recently used distribution lists or groups, performs keyword searches to identify recipient identifiers, and provides convenient modification of existing distribution lists or groups.

4 Claims, 5 Drawing Sheets

U.S. PATENT DOCUMENTS

| | | | |
|---|---|---|---|
| 5,905,793 | A | 5/1999 | Flockhart et al. |
| 5,920,701 | A | 7/1999 | Miller et al. |
| 5,960,406 | A | 9/1999 | Rasansky et al. |
| 5,963,913 | A | 10/1999 | Henneuse et al. |
| 5,982,873 | A | 11/1999 | Flockhart et al. |
| 6,064,976 | A | 5/2000 | Tolopka |
| 6,085,166 | A | 7/2000 | Beckhardt et al. |
| 6,101,480 | A | 8/2000 | Conmy et al. |
| 6,115,709 | A * | 9/2000 | Gilmour et al. ............. 705/7.29 |
| 6,147,685 | A | 11/2000 | Bliss et al. |
| 6,163,607 | A | 12/2000 | Bogart et al. |
| 6,173,053 | B1 | 1/2001 | Bogart et al. |
| 6,192,111 | B1 | 2/2001 | Wu |
| 6,192,122 | B1 | 2/2001 | Flockhart et al. |
| 6,272,074 | B1 | 8/2001 | Winner |
| 6,360,217 | B1 | 3/2002 | Gopal et al. |
| 6,363,352 | B1 | 3/2002 | Dailey et al. |
| 6,370,566 | B2 | 4/2002 | Discolo et al. |
| 6,377,965 | B1 | 4/2002 | Hachamovitch et al. |
| 6,434,571 | B1 | 8/2002 | Nolte |
| 6,570,555 | B1 | 5/2003 | Prevost et al. |
| 6,594,637 | B1 | 7/2003 | Furukawa et al. |
| 6,640,230 | B1 | 10/2003 | Alexander et al. |
| 6,662,309 | B2 | 12/2003 | Ando et al. |
| 6,675,356 | B1 | 1/2004 | Adler et al. |
| 6,694,335 | B1 | 2/2004 | Hopmann et al. |
| 6,731,323 | B2 | 5/2004 | Doss et al. |
| 6,988,128 | B1 | 1/2006 | Alexander et al. |
| 7,007,235 | B1 | 2/2006 | Hussein et al. |
| 7,016,909 | B2 | 3/2006 | Chan et al. |
| 7,027,995 | B2 | 4/2006 | Kaufman et al. |
| 7,035,865 | B2 | 4/2006 | Doss et al. |
| 7,082,402 | B2 | 7/2006 | Conmy et al. |
| 7,113,797 | B2 | 9/2006 | Kelley et al. |
| 7,130,885 | B2 | 10/2006 | Chandra et al. |
| 7,149,810 | B1 | 12/2006 | Miller et al. |
| 7,155,435 | B1 | 12/2006 | Day et al. |
| 7,187,384 | B2 | 3/2007 | Noyle |
| 7,188,073 | B1 | 3/2007 | Tam et al. |
| 7,254,569 | B2 | 8/2007 | Goodman et al. |
| 7,283,970 | B2 | 10/2007 | Cragun et al. |
| 7,334,000 | B2 | 2/2008 | Chhatrapati et al. |
| 7,343,312 | B2 | 3/2008 | Capek et al. |
| 7,343,313 | B2 | 3/2008 | Dorenbosch et al. |
| 7,353,466 | B2 | 4/2008 | Crane et al. |
| 7,363,590 | B2 | 4/2008 | Kerr et al. |
| 7,383,291 | B2 | 6/2008 | Guiheneuf et al. |
| 7,383,303 | B1 | 6/2008 | Bort |
| 7,395,221 | B2 | 7/2008 | Doss et al. |
| 7,436,654 | B2 | 10/2008 | Cho |
| 7,440,961 | B1 | 10/2008 | Matousek |
| 7,519,672 | B2 | 4/2009 | Boss et al. |
| 7,595,717 | B2 | 9/2009 | Boss et al. |
| 7,693,734 | B2 | 4/2010 | Christenson et al. |
| 7,693,736 | B1 | 4/2010 | Chu et al. |
| 7,778,858 | B1 | 8/2010 | Daily et al. |
| 7,827,240 | B1 | 11/2010 | Atkins et al. |
| 7,984,378 | B1 | 7/2011 | Atkins et al. |
| 2002/0085701 | A1 | 7/2002 | Parsons et al. |
| 2002/0117847 | A1 | 8/2002 | Ede et al. |
| 2002/0120600 | A1 | 8/2002 | Schiavone et al. |
| 2002/0144136 | A1 | 10/2002 | Stornetta et al. |
| 2003/0046304 | A1 | 3/2003 | Peskin et al. |
| 2003/0069880 | A1 | 4/2003 | Harrison et al. |
| 2003/0154293 | A1 | 8/2003 | Zmolek |
| 2003/0163537 | A1 | 8/2003 | Rohall et al. |
| 2004/0054726 | A1 | 3/2004 | Doss et al. |
| 2004/0128181 | A1 | 7/2004 | Zurko et al. |
| 2004/0168133 | A1 | 8/2004 | Wynn et al. |
| 2004/0192857 | A1 | 9/2004 | Borer et al. |
| 2004/0199663 | A1 | 10/2004 | Horvitz et al. |
| 2004/0254998 | A1 | 12/2004 | Horvitz |
| 2005/0069099 | A1 | 3/2005 | Kozdon et al. |
| 2005/0125246 | A1 | 6/2005 | Muller et al. |
| 2005/0125248 | A1 | 6/2005 | Butterworth et al. |
| 2005/0165631 | A1 | 7/2005 | Horvitz |
| 2005/0171818 | A1 | 8/2005 | McLaughlin |
| 2005/0192857 | A1 | 9/2005 | Levine |
| 2005/0198144 | A1 | 9/2005 | Kraenzel et al. |
| 2006/0004843 | A1 * | 1/2006 | Tafoya et al. ................. 707/102 |
| 2006/0020889 | A1 | 1/2006 | Coppinger et al. |
| 2006/0031326 | A1 | 2/2006 | Ovenden |
| 2006/0031470 | A1 | 2/2006 | Chen et al. |
| 2006/0047557 | A1 | 3/2006 | Bieselin et al. |
| 2006/0069686 | A1 | 3/2006 | Beyda et al. |
| 2006/0184584 | A1 | 8/2006 | Dunn et al. |
| 2006/0190485 | A1 | 8/2006 | Adams et al. |
| 2006/0212330 | A1 | 9/2006 | Savilampi |
| 2006/0242109 | A1 | 10/2006 | Pereira et al. |
| 2007/0016878 | A1 | 1/2007 | Forlenza et al. |
| 2007/0118415 | A1 | 5/2007 | Chen et al. |
| 2007/0174104 | A1 | 7/2007 | O'Sullivan et al. |
| 2007/0265903 | A1 | 11/2007 | Blair et al. |
| 2008/0005685 | A1 | 1/2008 | Drews et al. |
| 2008/0034425 | A1 | 2/2008 | Overcash et al. |
| 2008/0037733 | A1 | 2/2008 | Chen et al. |

FOREIGN PATENT DOCUMENTS

| | | |
|---|---|---|
| EP | 1560138 | 8/2005 |
| WO | WO 2005/010715 | 2/2005 |

OTHER PUBLICATIONS

U.S. Appl. No. 11/554,442, filed Oct. 30, 2006, Atkins et al.
U.S. Appl. No. 11/554,478, filed Oct. 30, 2006, Atkins et al.
U.S. Appl. No. 11/669,707, filed Jan. 31, 2007, Blair et al.
U.S. Appl. No. 12/570,933, filed Sep. 30, 2009, Mohler.
"Avaya™ Unified Communication Center (UCC) Speech Access Solution," Avaya, Inc., 2002, 4 pages.
"FreeBusy—Microsoft Outlook email autoresponder," at http://freebusy.4team.biz/, printed May 24, 2006, 4 pages.
"How to Use a TTY," NETAC Teacher Tipsheet, at http://72.14.203.104/search?q=cache:JdktLkxPgMUJ:www.netac.rit.edu/downloads/TPSHT_TTY.pdf+%22teletypewriter%22+..., 1999, 4 pages.
"Meetings in America," MCI Conferencing, available at http://e-meetings.mci.com/meetingsinamerica/uswhitepaper.php3, website updated Aug. 19, 2003, pp. 1-12.
"Microsoft Outlook in Your Small Business" http://www.bcentral.co.uk/products/microsoft-outlook.mspx; printed Mar. 14, 2006; 2 pages.
"Microsoft Outlook" http://en.wikipedia.org/wiki/Microsoft_Outlook; printed Mar. 14, 2006; 4 pages.
"Special Edition Using Lotus Notes and Domino 5" (Published by Que, Aug. 23, 1999, ISBN 0-7897-1814-6.
"TTY Brochure Feb. 2006," http://72.14.203.104/search?q=cache:O3tW0eQtbTEF:ods.utk.edu/brochures/TTYBrochureFebruary2006.pdf+%22teletypewrite... (Feb. 2006) 3 page.
"WebAccess Client User Guide" Novell GroupWise 6.5, Oct. 31, 2005, 68 pages.
"Windows Client User Guide" (Novell Groupwise 7.0, Mar. 14, 2008, copyright 2005-2008) discloses Groupwise 7.0 (released Aug. 15, 2005), 389 pages.
AIM Acronym Dictionary, http://www.aim.com/acronyms.adp (Jan. 16, 2007) 7 pages.
AIM Bots, http://developer.aim.com/botMain.jsp (2006) 2 pages.
AIM Buddy Info, http://buddyinfo.aim.com/ (2006) 2 pages.
AIM Presence Services, http://developer.aim.com/presenceMain.jsp (2006) 2 pages.
Arthur M. Rosenberg and David A. Zimmer, "Beyond VoIP: Enterprise Perspectives on Migrating to Multi-Modal Communications and Wireless Mobility." (Oct. 2004) 38 pages.
Arthur M. Rosenberg and David A. Zimmer, "Migrating to Enterprise-Wide Communications: The Branch Office Dilemma," May 2003, 14 pages.
Avantgo: AvantGo launches new release of Pylon products; AvantGo Pylon 5.1 offers new support for Domino 6, Palm OS 5 and custom repeating meetings M2 Presswire. Coventry: Jan. 24, 2003. p. 1-4.
Avaya by Example; Three-Week Wonder: Avaya Unified Communication Center Speech Access Gives Road Warriors 15 Additional Days Each Year, Avaya, Inc. (2005) 3 page.
Avaya Case Study (Advertising Agency Uses Avaya Unified Messenger to Streamline Communications, 2003 Avaya Inc.), 2 pages.

Avaya Press Release (Avaya Introduces IBM Lotus Domino Version of Its Market-Leading Unified Messaging Software, http://www.avaya.com/usa/Error404.aspx?currentpath=master-usa/en-us/corporate/pressroom/pressreleases/2003/pr-03,Jan. 27, 2003), 4 pages.
Avaya Unified Messenger Client User Guide (2002 Avaya Inc.) Avaya Web Pages (Retrieved Archive.org from Jun. 13, 2004), 167 pages.
Avaya Unified Messenger Solution—Microsoft Exange 2000 version Installation Guide (2002 Avaya Inc.) 164 pages.
Avaya Unified Messenger Solution—Microsoft Exange Version, 2000 version (2002 Avaya Inc), 8 pages.
Boyce, "Microsoft Office Outlook 2003 Inside Out," Nov. 5, 2003, Microsoft Press, Chapter 2.
Boyce, "Microsoft Office Outlook 2003 Inside Out," Nov. 5, 2003, Microsoft Press, Chapters 1, 19, 20.
Chapters 4, 5 and 7 from Microsoft® Office Outlook® 2003; "Step by Step"; Online Training Solutions, Inc.
Clayton, B., "Microsoft Outlook 2003 Enhancements," modified Apr. 19, 2004, Purdue University, 4 pages.
Anderson et al., "Artificial Neural Networks Technology," at http://www.dacs.dtic.mil/techs/dacs_reports/text/neural_nets.txt, Aug. 20, 1992, 145 pages.
Dey et al., "CybreMinder: A Context-Aware System for Supporting Reminders," Proceedings of Handheld and Ubiquitous Computing: Second International Symposium, HUC 2000, Bristol, UK, Sep. 2000, Jul. 31, 2003, vol. 1927/2000, 15 pages.
"EffectiveMeetings.com: Your Meeting Resource Center," SMART Technologies, Inc., May 2003, 1 page.
Brondsted, "The Linguistic Components of the Reward Dialogue Creation Environment and Run Time System," IVTTA Turin 98, Sep. 1998, http://cpk.auc.dk/~tb/articles/ivtta98.htm, 13 pages.
"Step by Step," Microsoft Outlook 2003, Online Training Solutions, Inc., Copyright 2004, USA, pp. 1-119.
"Step by Step," Microsoft Outlook 2003, Online Training Solutions, Inc., Copyright 2004, USA, pp. 120-225.
"Step by Step," Microsoft Outlook 2003, Online Training Solutions, Inc., Copyright 2004, USA, pp. 226-334.
Raider, "Make Address Book Smart Groups auto-complete in mail," MacOsHints.com, contributed Jun. 29, 2005, pp. 1-4.
Kassel, R., "How Speech Recognition Works," http://www.microsoft.com/speech/docs/How_Speech_Works_Article.htm, Nov. 30, 2004, 4 pages.
Vitale, T., "Hardware and Software Aspects of a Speech Synthesizer Developed for Persons With Disabilities," http://codi.buffalo.edu/archives/computing/.dec.speech, 1993, 22 pages.
Yin, M., "[Design] linking and grouping items," available at http://lists.osafoundation.org/pipermail/design/2005-August/003159.html, Aug. 1, 2005, pp. 1-2.
"Products: Groove Virtual Office," groove.com, 2005, retrieved Mar. 11, 2011, http://replay.waybackmachine.org/20050419010213/http://www.groove.net/index.cfm/pagenamelVirtualOffice/, 2 pages.
"Competitive analysis of collaboration tools," http://www.hcii.cmu.edu/M-HCI/2004/sun/competition.htm, 2004, retrieved Mar. 11, 2011, 6 pages.
Background of the Invention for the above-captioned application filed May 25, 2011 (previously provided).
Official Action for U.S. Appl. No. 11/554,442, mailed Apr. 13, 2009.
Official Action for U.S. Appl. No. 11/554,442, mailed Oct. 27, 2009.
Official Action for U.S. Appl. No. 11/554,442, mailed Feb. 26, 2010.
Official Action for U.S. Appl. No. 11/554,442, mailed Aug. 9, 2010.
Notice of Allowance for U.S. Appl. No. 11/554,442, mailed Feb. 23, 2011.

* cited by examiner

| Group ID | Group Members | Instance Counter Value | Timestamp | Flag Value | Name |
|---|---|---|---|---|---|
| 1 | JSmith@acme.com<br>MBates@acme.com<br>JHancock@acme.com | 2 | 10:01am 8/8/06 | 0 | None |
| 2 | JSmith@acme.com<br>Washington@aol.com<br>Bush@yahoo.com | 5 | 11:06am 8/8/06 | 1 | IP Group |
| 3 | B.Cheney@whitehouse.gov<br>CPowell@cnn.com | 10 | 12:01pm 8/8/06 | 1 | None |
| ... | ... | ... | ... | ... | ... |

AUTOMATIC DISPLAY OF EMAIL DISTRIBUTION LISTS

CROSS-REFERENCE TO RELATED APPLICATIONS

This application claims the benefit and is a Divisional of U.S. application Ser. No. 11/554,442 filed Oct. 30, 2006, entitled "Automatic Display of Email Distribution Lists" which is incorporated herein by reference in its entirety.

FIELD OF THE INVENTION

The invention relates generally to messaging systems and particularly to text messaging systems.

BACKGROUND OF THE INVENTION

Messaging systems are in widespread use. Messaging systems can be single or multi-media and real time or non-real time.

Electronic voice mail systems, the oldest messaging system, allow a user to receive, edit, and forward voice messages. Each subscriber normally has his or her own mailbox for receiving voice messages. The voice message is typically digitized and stored in the mailbox until deleted by the subscriber. After digitization, the voice message can be handled as a paper message. It can be copied, stored, sent to one or many people, with or without comment.

Electronic text mail or Email systems are the next oldest messaging system. It is a store-and-forward service for transmitting textual messages transmitted in machine readable form from a communication device, such as a computer terminal or computer system. As in the case of voice mail, the email is stored in the recipient's mailbox until for access by the user. In Email systems, each subscriber may be provided with a directory or listing of stored emails. A directory includes a representation of each email and a pointer to the stored email itself The representation can include descriptive information, such as whether or not the email has been read, a level of urgency of the email, a description of the email contents, the email sender, and a timestamp associated with the email. In addressing email, an autocomplete function can provide, within a few characters of typing the addressee entry, a list of frequently emailed contacts that may include the desired addressee. For example, when typing an email to "Lenard, Rohan", the user need only type in "L-E-N" prior to a match being displayed. The user can then select the match, and the remaining part of the addressee entry will be completed automatically.

Unlike voice mail and Email systems, which are not considered to be real-time communication channels, instant messaging is effectively real time text messaging. When a user logs into his computer, he is informed which of his "buddies" are on line. The user can type a text message and hit "send". The recipient sees the instant message immediately. Instant messaging is essentially real-time, on-line electronic mail.

An ongoing problem with messaging systems is complexity and efficiency. If a sender wishes to send a group of recipients a message, he has several choices. First, he can laboriously enter each recipient's address separately. This method requires the user to remember the address of each recipient, which can be a problem for large numbers of recipients. Although the autocomplete function exists in most messaging applications, such as Microsoft Outlook™, these options still require the sender to remember at least part of the name and/or address of each recipient and do not obviate the need to enter each address addressee-by-addressee. Second, he can create a distribution list including the addresses of the selected recipients and simply reference it by group name. The problem with this method is the time and effort required to create the distribution list. Finally, when the message to be sent can be configured as a reply to the sender and other recipients of a prior message he can hit "reply all" and the message will automatically be sent to each of the other parties. This often requires the sender to locate a message listing all of the recipients in addressee fields, which can take time.

SUMMARY OF THE INVENTION

These and other needs are addressed by the various embodiments and configurations of the present invention. The present invention is directly generally to autocompletion functionality in messaging applications.

In a first embodiment of the present invention, a messaging method is provided that includes the steps of:

(a) monitoring, in incoming messages to a user and/or outgoing messages from the user, a frequency and/or recency of use, in individual messages, of a multi-member set of recipient identifiers; and (b) when, during completion of an outgoing message, the user inputs at least part of an identifier in a monitored multi-member set of recipient identifiers, providing the user with the monitored multi-member set of recipient identifiers as an option, which option, if selected by the user, would populate automatically a recipient field of the outgoing message.

The monitored incoming and/or outgoing messages may be voice, text, video, and combinations thereof In a second embodiment, a messaging method is provided that includes the steps of:

(a) receiving from a user, as part of completing an outgoing message, at least a part of a recipient identifier;

(b) matching the inputted portion of the identifier with a number of single and/or multi-member group recipient identifiers to form a set of matching identifiers;

(c) ordering the members of the set of matching identifiers using the occurrence and/or nonoccurrence of selected expressions in the subject and/or message text fields of the outgoing message; and (d) providing, to the user a listing of the matching identifiers in the ordering determined in step (c).

In a third embodiment, a messaging method that includes the steps of:

(a) receiving from a user, as part of completing an outgoing message, at least one keyword;

(b) searching a collection of messages and/or stored representations thereof for occurrences of the keyword(s) to identify a matching set of messages and/or stored representations thereof;

(c) determining, for the matching set, a corresponding set of recipient identifiers, each member in the recipient identifier set having one or more corresponding members in the matching set;

(d) providing the members of the recipient identifier set to the user; and (e) when the user selects one of the provided members, populating automatically a message recipient field of the outgoing message.

In a fourth embodiment of the present invention, a messaging method includes the steps of:

(a) from an incoming message and/or electronic calendar entry, receiving a request to create a new grouping of recipient identifiers and/or add a recipient identifier to an existing grouping of recipient identifiers, the incoming message and/or electronic calendar entry including at least one recipient identifier; and (b) creating the new grouping of recipient identifiers including the recipient identifier and/or adding the recipient identifier to an existing grouping of recipient identifiers.

The present invention can provide a number of advantages depending on the particular configuration. The invention can provide a convenient and simple way for a user to manage distribution lists for messages and appointments that requires little effort by the user. The invention can enable the user to quickly generate even large distribution lists without forgetting recipient identifiers. The invention can permit the user to quickly find recipient identifiers using keyword searches, even when the user has forgotten completely the identifier of one or more recipients.

These and other advantages will be apparent from the disclosure of the invention(s) contained herein.

As used herein, " at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. The invention is not limited to use with any particular type of communication system switch, server, or configuration of system elements. Those skilled in the art will recognize that the disclosed techniques may be used in any communication application in which it is desirable to provide improved contact processing.

Figure 1:
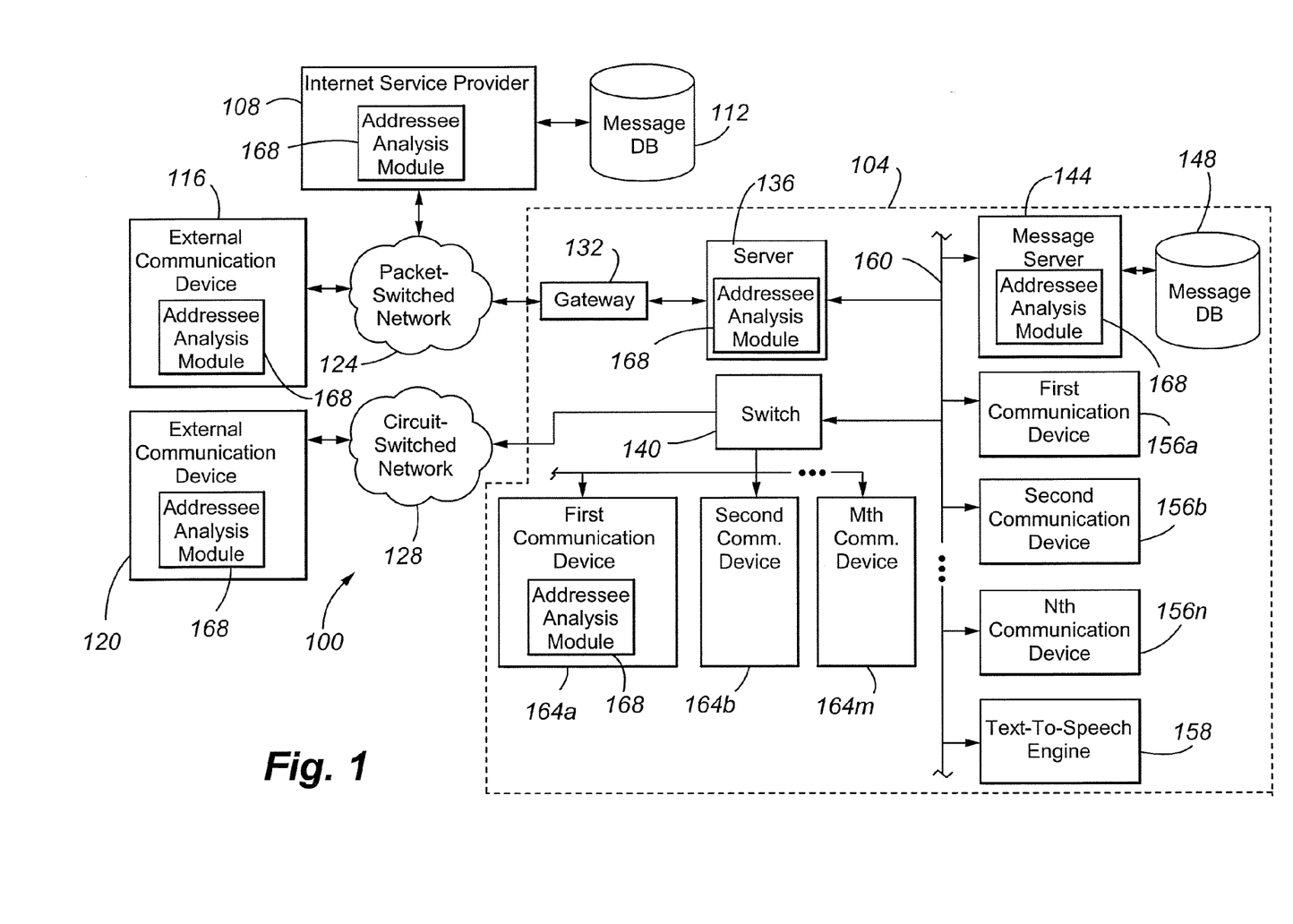
FIG. 1 depicts a communication network according to an embodiment of the present invention.

FIG. 1 shows an illustrative embodiment of the present invention. The communication system 100 includes an enterprise network 104, Internet Service Provider (ISP) 108 and associated message database 112, and external communication devices 116 and 120, interconnected by a packet-switched and circuit-switched networks 124 and 128.

The enterprise network 104 in turn includes a gateway 132, a server 136, a message server 144 and associated message database 148, Text-To-Speech engine 152, and first, second, . . . nth packet-switched communication devices 156a-n interconnected by Local Area Network (LAN) 160, and a switch 140 connected to first, second, . . . mth circuit-switched communication devices 164a-m.

The packet-switched network 124 is a distributed processing network, such as the Internet, and the circuit-switched network 128 is typically the Public Switched Telephone Network (PSTN).

The Internet Service Provider or ISP 108 is a vendor providing access for customers to the packet-switched network 124. The ISP 108 can provide a core group of Internet utilities and services, such as email, news group readers, weather reports, restaurant reviews, and the like. The user typically reaches the ISP 108 by either dialing-up with his communication device (e.g., computer), modem, and phone line or over a dedicated line installed by a telephone company. The associated database 112 includes ISP customer information and customers' email mailboxes.

The gateway 132 is a conventional electronic signal repeater that intercepts and steers electronic signals from one network to another.

The server 136 and switch 140 can be separate as shown or integrated. The term "switch" or "server" as used herein should be understood to include a PBX, an ACD, an enterprise switch, or other type of communications system switch or server, as well as other types of processor-based communication control devices such as media servers, computers, adjuncts, etc. The server 136 and/or switch 140 can be any architecture for directing contacts to one or more communication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced communication devices. Other types of known switches and servers are well known in the art and therefore not described in detail herein.

The message server 144 is an application server that provides one or more messaging services. The messaging server 144, for example, can be a voice mail server, an email server, an instant messaging server, a text chat server, and the like. Depending on the type of messaging server 144, the message database 148 includes subscriber mailboxes, stored messages, subscriber associated addressee lists (e.g., contact lists, buddy lists, telephone directories, and the like), subscriber authentication information, and the like.

The TTS conversion engine 152 converts text into corresponding speech and is conventional.

The internal first, second, . . . nth communication devices 156a-n and external communication device 116 are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and any other communication device.

The internal first, second, ... mth communication devices 164a-m and external communication device 120 are time division multiplexed and/or circuit-switched. Each of the communication devices 164a-m and/or 156a-n correspond to one of a set of internal extensions. These extensions are referred to herein as "internal" in that they are extensions within the premises that are directly serviced by the switch and/server while "external" communication devices 116 and 120 are not within the premises that are directly serviced by the switch and/or server. More particularly, these extensions correspond to conventional communication device endpoints serviced by the switch/server, and the switch/server can direct incoming calls to and receive outgoing calls from these extensions in a conventional manner. The second communication devices can include, for example, wired and wireless telephones, PDAs, H.320 video phones and conferencing units, voice messaging and response units, traditional computer telephony adjuncts, and any other communication device.

It should be noted that the invention does not require any particular type of information transport medium between switch or server and first and second communication devices, i.e., the invention may be implemented with any desired type of transport medium as well as combinations of different types of transport channels.

Included in one or more of the ISP 108, external communication devices 116 and/or 120, server 136, message server 144, and/or communication devices 164 is an addressee analysis module 168. The module 168 provides a modified type of autocomplete functionality for inputted addressee identifiers. As will be appreciated, the addressee identifier can be any unique identifier of an addressee, such as an email address, telephone number, IP address, name, and the like. The module 168, for each user or subscriber, monitors the addressee identifiers used in messages, for more frequently used addressee identifier groups creates, with or without user or subscriber input, groups of identifiers, and, when the user or subscriber is entering an identifier, provides a list of likely (matching) single identifiers, distribution list names, and automatically generated identifier groups. The module 168 may be in a number of locations, including in an ISP 108, a packet-switched or circuit-switched communication device 116 and 120, respectively, the server 136, the switch 140, the first, second, ... mth internal communication devices 164a-m, the message server 144, and/or the first, second, ... nth communication devices 156a-n.

Figure 2:
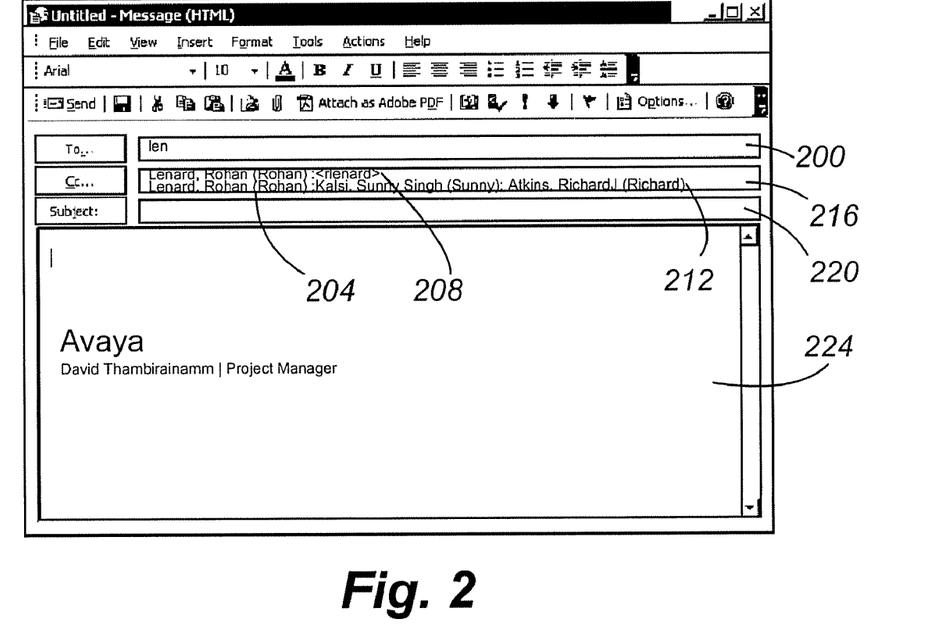
FIG. 2 is a screen shot of a graphical user interface according to an embodiment of the present invention.
Figure 3:
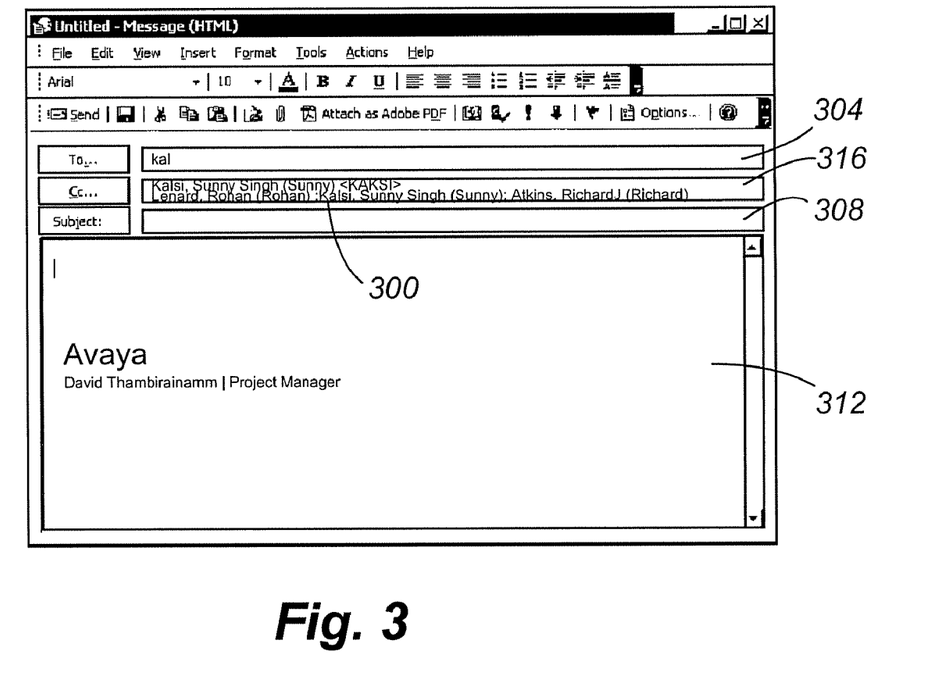
FIG. 3 is a screen shot of a graphical user interface according to an embodiment of the present invention.

Referring to FIGS. 2 and 3, the graphical user display presented by the module 168 to the user will be described. The figures show that the module monitors the set of addressee identifiers that the user sends messages to, derives a set of commonly messaged groups, stores the commonly messaged groups internally, and, whenever the user starts to type in letters that are contained in the identifier of an addressee, displays as a separate option not only the corresponding identifier of the individual but also any of the commonly used groups of which the identifier is a member. For example, in FIG. 2 the user has typed in "L-E-N" in the "TO" addressee field 200. A matching identifier is "Lenard, Rohan" and would be displayed in the drop down list 204 as a first entry 208. In addition, Rohan Lenard is a member of a frequently used group containing not only the identifier Rohan Lenard but also the identifiers Sunny Singh Kalsi and Richard J. Atkins as a second entry 212 in the drop down list 204.

Although the group match can be a simple string analysis, it is preferably a semantic analysis that matches against any member of the group. In other words, the group would be listed not only if the first member of the group matched but also when the first member is not a match but a later member is. Thus, if the user were to type "A-T-K", the user would see in the drop down list:

1. Atkins, Richard
2. Lenard, Rohan; Atkins, Richard; Kalsi, Sunny

The module will thus recommend frequently messaged lists of individuals alongside individual matches. This is illustrated in FIG. 2 in which the first name is the first name in the drop down list 204. In contrast, FIG. 3 shows the same frequently used group in a drop down list 300 when a different identifier in the group is entered in the addressee field 304. Specifically, "K-A-L" is entered instead of "L-E-N".

The frequently used group could be converted, automatically or at the instruction of the user, into a distribution list having a name. For example, in either FIG. 2 or 3 one could right click on the group of names that is prompted and select an option from a drop down menu (not shown) to convert the group into a distribution list. The user could further input a desired name for the list. Alternatively, the user could select from the drop down menu an option to delete or edit the group without changing it to a distribution list. By deleting the group, it would be flagged as not being eligible for redesignation as a frequently used group. The user could edit the group by adding new members or removing existing members.

The monitoring operation of the module 168 will now be described with reference to FIGS. 4 and 5.

In step 500, a stimulus is detected. The stimulus can be any suitable event, such as clicking on the "send" icon in an originated, forwarded, or replied message, or clicking on a "learn" command. In a learn command, the user selects a number of historical messages and, by then clicking on the "learn" command triggers the module 168 into analyzing the historical messages as if they had just been sent. In other words, the timestamps of the messages would be ignored in determining whether or not identifiers in the "TO" and/or "CC" fields 200 and 216, respectively, and/or "BCC" field constituted a frequently used group. In one configuration, each of the selected historical messages would be added automatically as a frequently used group regardless of the number of instances of occurrence.

In decision diamond 504, the module 168 determines whether or not the identifier group (if any) in the selected message matched an existing group stored in memory. FIG. 4 shows an exemplary set of data structures used by the module 168. Each frequently used group has a respective group ID 400, an associated listing 404 of member identifiers, an associated counter value 408 recording a number of instances of use of the group over a selected time period (e.g., one month), an associated timestamp 412 indicating when the group was last used, a flag value 416 indicating whether or not the associated group qualifies as a frequently used group, and a name 420 associated with the group, if any. In one configuration, the data structures may include one or more describers of the nature, purpose or intent or an associated activity of the group. For example, one or more words used in the subject matter of the "Subject" field 220 or 308 or message field 224 or 312 may be listed as a describer.

Figure 4:
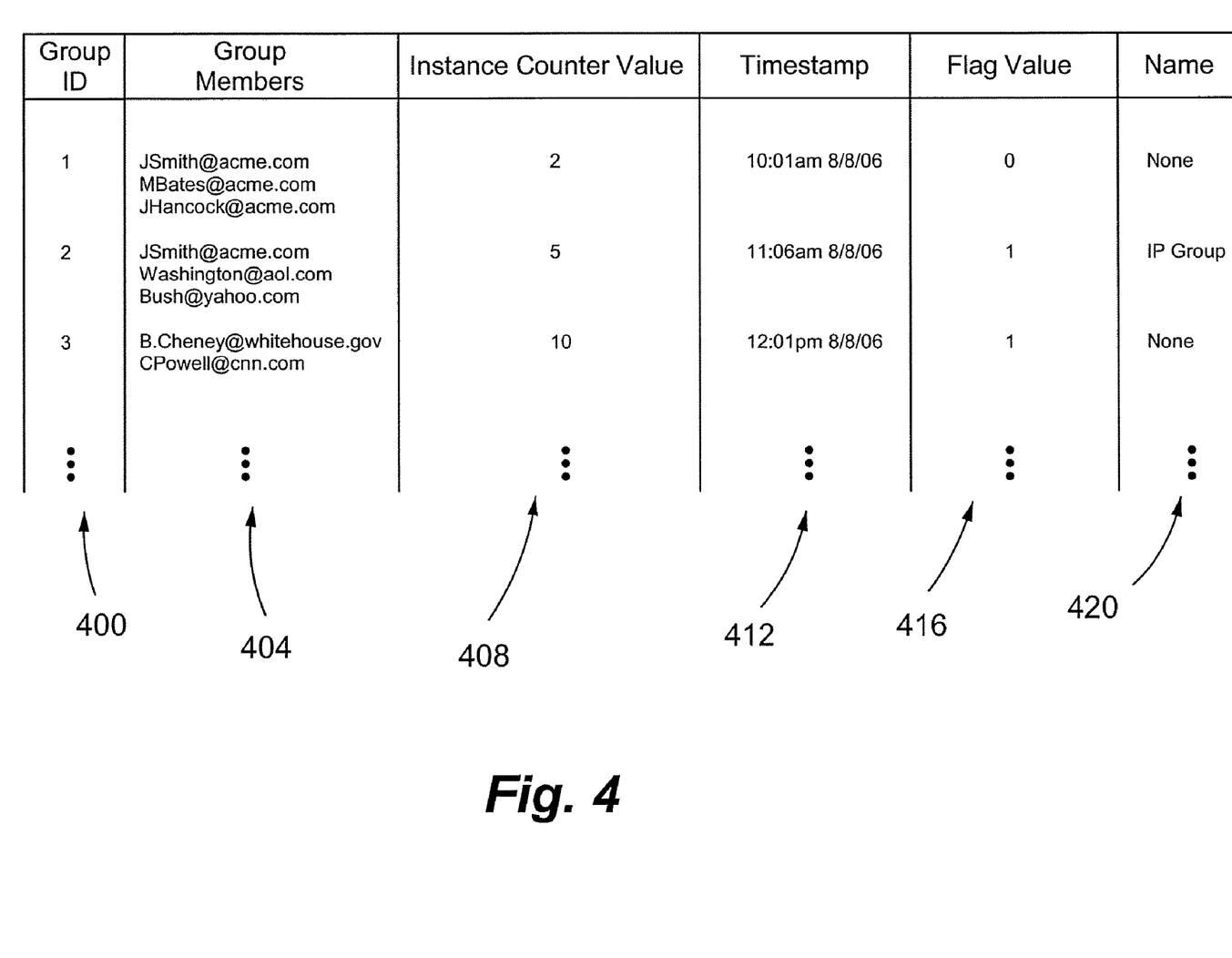
FIG. 4 depicts a set of data structures according to an embodiment of the present invention.
Figure 5:
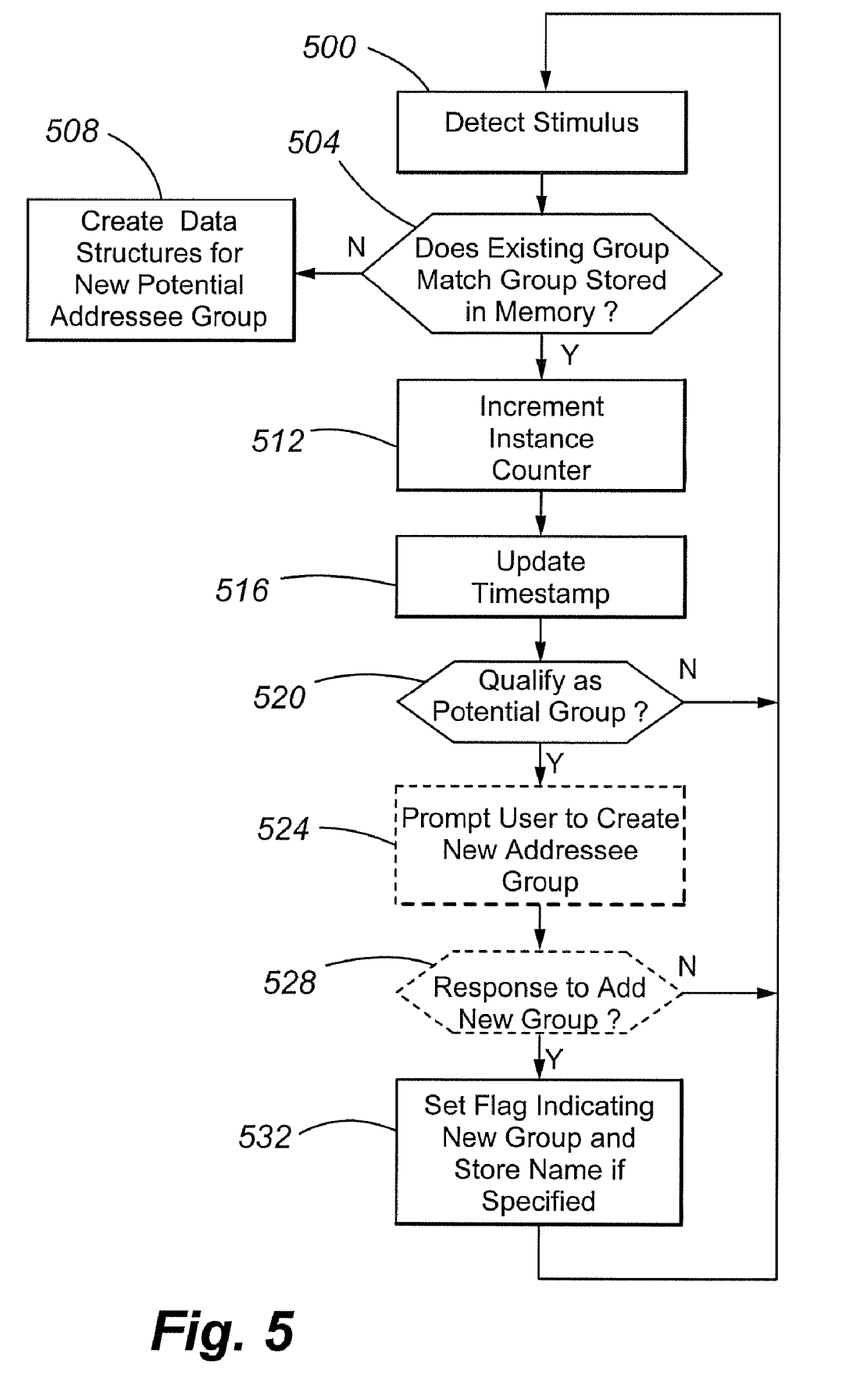
FIG. 5 is an operational flow chart according to an embodiment of the present invention.

When the membership of the selected group does not match membership of an existing (stored) group, the module 168 in step 508 creates the data structures of FIG. 4, with the instance counter value being "1", the timestamp 412 being a timestamp associated with the message (such as when the message was sent by the user), the flag value is "0", and optionally one or more describers in the description field. The describers may be selected by parsing the Subject and/or message text fields 220 and 308 and/or 224 and 312, respectively. The membership of the group may be based on the entries in the "TO" field 200 or 304 alone, the "CC" field 216 or 316 alone, the "BCC" field (not shown) alone, or the fields collectively. When analyzed collectively, the group members 404 may include an indicator (not shown) of whether the member was used in the "TO", "BCC", or "CC" field. When the module 168, in response to a user election from the drop down list, later populates the "TO", "BCC", and "CC" fields to reflect the selected group, the member identifiers may be populated in the field indicated by the associated indicator.

When the selected group matches a stored group 404, the module 168, in step 512, increments the instance counter value 408, in step 516 updates the timestamp 412 to reflect a timestamp of the selected message, and in decision diamond 520 determines whether the group 404 qualifies as a potential frequently used group. This determination can be based on any useful criteria. Preferably, the criteria is whether the instance counter value 408 has a threshold value. In one configuration, each entry has a number of timestamps 412, each indicating an instance of use of the associated group. The module 168 periodically ages out older timestamps and decrements the instance counter value 408 accordingly. In other words, the instance counter value is adjusted to reflect a number of instances of use of each group over a selected period of time.

When the group fails to qualify as a frequently used group, the module 168 returns to step 500 and awaits the next stimulus.

When the group now qualifies as a frequently used group, the module 168, in optional step 524, prompts the user to create a new frequently used addressee group. In other words, a frequently used addressee group is not made automatically but must be accepted by the user.

When optional step 524 is performed, the module 168, in optional decision diamond 528 determines whether the user has responded within a selected period of time to the prompt to add the group as a new group. When the user indicates that the group is not to be recognized as a frequently used group or when a time out occurs, the module 168 returns to and repeats step 500. In one configuration, when the user indicates that the group is not to be recognized as a frequently used group, the group is identified as being ineligible to be recognized as such a group. This prevents repeated prompting of the user in step 524 for the same group which the user has previously identified as not being eligible for recognition as a frequently used group.

Depending on the configuration when the user response in decision diamond 528 is to create a frequently used group or when the group qualifies as a potential frequently used group in decision diamond 520, the module 168 sets the flag value 416 to "one" indicating that the group is to be processed in the future as a frequently used group.

Figure 6:
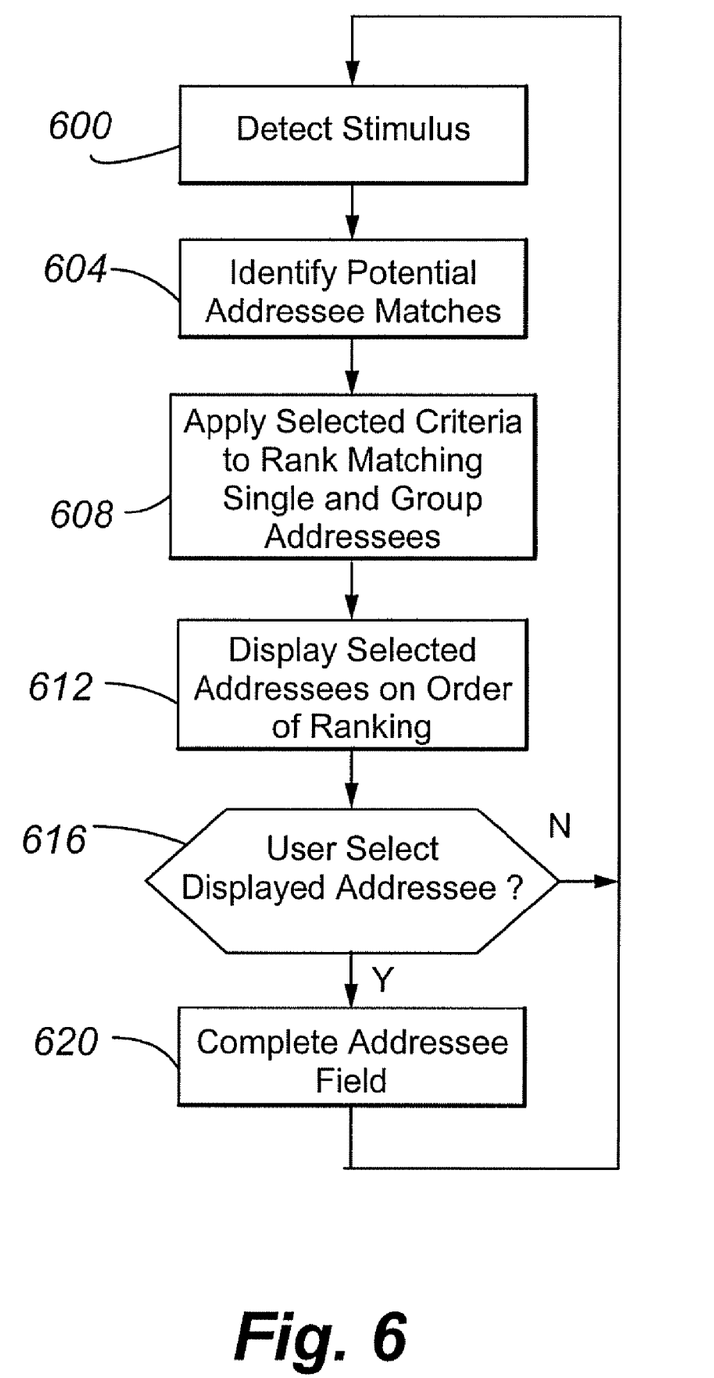
FIG. 6 is an operational flow chart according to an embodiment of the present invention.

The autocompletion function according to an embodiment of the present invention will now be described with reference to FIG. 6.

In decision diamond 600, the module 168 detects a stimulus. The stimulus is the user entering a selected number of characters in the "TO", "BCC", or "CC" fields. The selected number of characters may be as few as one. The stimulus occurs independently for each new identifier entered into one of the fields and occurs repeatedly for the same identifier as more characters are entered by the identifier. This typically causes the number of listed identifiers in the drop down list to decrease as more characters in the identifier are received.

In step 604, the module 168 identifies potential single and group identifier matches. For group identifiers, this step frequently includes the previously completely entered identifiers in the "TO", "BCC", and "CC" fields. For groups, the use of one or more previously entered identifiers and a partial current (incomplete) identifier can provide a much more accurate estimate of likely groups by eliminating unmatched groups.

In step 608, the module 168 applies selected criteria to rank the matching single and frequently used group identifiers. The ranking may be based on probability of a complete identifier match and/or type of identifier. By way of example, the selected criteria can be based upon type of identifier (whether it is a single or frequently used group member identifier), when a frequently used group member identifier the existence and/or number of previously entered group member identifiers in the "TO" and/or "CC" fields, the recency of last use (or timestamp value) of the single identifier or frequently used group, the instance counter value of the single identifier or frequently used group, the existence of one or more descriptors in the Subject and/or message text fields of the message, for a frequently used group member identifier the number of group members, and maximum drop down list length. The use of descriptor instances in the ranking determination is particularly useful where the user has already fully or partially completed the Subject or text message field or when the user is forwarding or replying to a message. To identify instances of descriptors in one or both of these fields, the contents of the fields, if any, would need to be parsed to identify occurrences of the descriptors.

In step 612, the matching single identifiers and frequently used groups are then ordered based upon their relative rankings and displayed to the user in a drop down list.

In decision diamond 616, the module 168 determines whether or not the user selected one of the listed message identifiers or frequently used groups within a selected period of time (which may end when the next character is entered). If not, the module 168 returns to and repeats step 600. If so, the module 168, in step 620, completes the "TO", "BCC", and/or "CC" fields to be the selected item and returns to step 600.

A number of variations and modifications of the invention can be used. It would be possible to provide for some features of the invention without providing others.

For example in one alternative embodiment, the frequently used group can be created from an electronic calendar entry, such as Outlook™. For example, an invitation can be used as the basis for creating a frequently used group, such as using the learn command referenced above or by automated monitoring the accepted invitation.

In another alternative embodiment, an identifier could be added to an existing frequently used group or distribution list directly from a message or calendar entry. For example, if the user has defined a "patent team" distribution list and someone sends an email asking to be added to the team, the user can add the new person to the distribution list directly from the email. One way to accomplish this would be to allow the user to right-click on the new person's name, which would pop up a menu on which "add to distribution list" would be an option.

In yet another alternative embodiment, auto-completion of the entire distribution list or invitee list when composing a message or scheduling a meeting is enabled. Currently, auto-completion in messaging and scheduling applications works on a per-person basis. When the user begins to type in a recipient's identifier, the module 168 would show options for automatically populating the entire distribution or invitee list. The options would include recently-used, unnamed distribution lists. For example, if the sender were to have previously sent or received a message addressed to Jimmy Carter, Ron Reagan, and Jerry Ford and has also sent or received a message addressed to Jimmy Carter, George Bush, and Bill Clinton. When the sender begins to type "C-A-R-T", he would be presented with the following options:

1. Carter, Jimmy
2. Carter, Jimmy; Reagan, Ron; Ford, Jerry
3. Carter, Jimmy; Bush, George; Clinton, Bill The user could administer a maximum time that an unnamed distribution list would be presented as an option or could administer a limit on the number of candidate distribution lists presented.

In yet another alternative embodiment, in the drop down list of matching identifiers a method for choosing from recent distribution lists is provided. An editable combination box is used for this purpose. An example is the address field in Internet Explorer™. The distinction between this embodiment and prior embodiments is that the user would need to start typing one of the recipient's identifiers to see the set of recent distribution lists. The set of recent distribution lists could also include lists where the user was a recipient and not simply those where he or she was the sender. The recent distribution lists includes not only frequently used, recent groups but also user configured distribution lists and identifier groups that may not be frequently used but have been recently used.

In yet another embodiment, a method for searching for candidate distribution lists based on message titles or contents is provided. This embodiment is similar to searching for messages containing certain words in their titles or contents. Instead of presenting the list of messages found by the search, the module 168 would present the distribution list for those messages. This is a convenient way to contact people whose identifiers are not remembered or otherwise unknown to the user provided that the user remembers the subject matter with which he or she corresponded previously with such persons. The descriptors described previously could be used in identifying such distribution groups.

In yet another embodiment, a method for creating automatically a distribution list based on the subject of a message or meeting invitation is provided. For example, if the user were organizing a happy hour, one could type "Happy Hour Friday" in the subject line of a message, and the messaging or calendar application would search through past messages and appointments for "happy", "hour", and "Friday." The software would then use the distribution lists from the messages that best match the search to compile a distribution list for the new message. The sender would then have the opportunity to remove unwanted identifiers from the distribution list before sending the message. As in the prior embodiment, descriptors could also be searched to identify potential distribution lists.

In the prior embodiments, distribution lists can include not only frequently used, recent groups but also user configured distribution lists and identifier groups that may not be frequently used but have been recently used.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A messaging method, comprising:
   (a) receiving from a user, as part of completing an outgoing message, at least a part of a recipient identifier;
   (b) matching the at least part of the recipient identifier with one or more of a plurality of single and multi-member group recipient identifiers to form a set of matching identifiers, wherein multi-member group recipient identifiers are included in the set of matching identifiers based on a semantic analysis such that all individual members of the multi-member group are listed when a first member of the multi-member group matches the at least part of the recipient identifier and also when the first member of the multi-member group is not a match with the at least part of the recipient identifier, but a later member of the multi-member group is a match with the at least part of the recipient identifier, wherein the user is provided with a selectable option for creating a frequently used multi-member group when the multi-member group recipient identifiers are provided to the user, the selectable option, when selected by the user, automatically populating a recipient field of the outgoing message with members of the provided multi-member group, wherein the user is always provided the selectable option for creating a frequently used multi-member group;
   (c) automatically ordering, by an addressee analysis module and a microprocessor, the members of the set of matching identifiers using at least one of an occurrence and nonoccurrence of selected expressions in at least one of a subject and a message text field of the outgoing message relative to one or more of: one or more past messages and one or more past appointments; and
   (d) providing to the user a listing of the matching identifiers in the ordering determined in step (c).

2. The method of claim 1, wherein a selected expression is at least one word.

3. A non-transitory computer readable information storage medium comprising processor executable instructions for performing the steps of claim 1.

4. A messaging server comprising an address analysis module having an auto-complete function including processor executable instructions to perform the steps of claim 1.

* * * * *